United States Patent [19]

Furda

[11] 4,223,023
[45] Sep. 16, 1980

[54] NONABSORBABLE LIPID BINDER

[76] Inventor: Ivan Furda, 16664 Meadowbrook La., Wayzata, Minn. 55391

[21] Appl. No.: 950,769

[22] Filed: Oct. 12, 1978

[51] Int. Cl.$^2$ .................... A61K 31/73; C08B 37/08
[52] U.S. Cl. .................... 424/180; 426/658; 536/20
[58] Field of Search .................... 536/20; 424/180; 426/658

[56] References Cited

U.S. PATENT DOCUMENTS

| | | | |
|---|---|---|---|
| 3,533,940 | 10/1970 | Peniston et al. | 536/20 |
| 3,879,376 | 4/1975 | Vanlerberghe et al. | 536/20 |
| 3,953,608 | 4/1976 | Vanlerberghe et al. | 536/20 |
| 4,034,121 | 7/1977 | Dunn et al. | 426/658 |
| 4,119,619 | 10/1978 | Rogozhin et al. | 536/20 |

*Primary Examiner*—Johnnie R. Brown
*Attorney, Agent, or Firm*—Sprung, Felfe, Horn, Lynch & Kramer

[57] ABSTRACT

The use of chitosan as a food additive or as a pharmaceutical preparation to reduce the absorption of lipids is disclosed. The chitosan, as such or in the form of fatty acid complex, may be admixed with food in a minor quantity; for example, an amount of about 1 to 10 percent by weight may be incorporated in a pharmaceutical preparation or composition for oral administration in an effective amount to reduce lipid absorption.

2 Claims, No Drawings

NONABSORBABLE LIPID BINDER

In certain mammals, and notably humans, it is often desirable, and sometimes necessary, to reduce the absorption of lipids such as triglycerides, fatty and bile acids, as well as cholesterol and other sterols.

Quite often, in weight control programs, it is difficult to control the ingestion of these materials and the subsequent digestion and absorption thereof cause weight and health problems. In accordance with the invention, I have discovered that if chitosan is ingested by mammals, it is capable of binding many times its weight in lipids, preventing the digestion and absorption thereof and promoting their excretion.

In accordance with the invention, chitosan is formulated and utilized as a food additive to reduce both absorption of lipids and caloric intake and also as a pharmaceutical for the treatment of obesity, coronary heart disease and certain gastro-intestinal disorders.

Chitosan constitutes a known material and is partially or fully deacetylated chitin. Chitin is a natural cellulose-like polymer which is present in fungal cell walls and exoskeletons of arthropods such as insects, crabs, shrimps or lobsters. The polymer structure of chitin consists of N-acetyl-D-glucosamine units linked by $\beta$-(1-4) glycosidic bonds which impart to the material characteristics similar to that of cellulose. Chitosan is conventionally prepared by the alkaline deacetylation of chitin with concentrated sodium hydroxide at elevated temperatures. Depending upon the conditions of the deacetylation, chitosan with various degrees of acetylation is obtained. In the most common products, the degree of deacetylation is between 70 and 90 percent. Although chitosan is usually obtained by chemical deacetylation of chitin, it may also be obtained by the fermentation of certain foods.

I have found that the chitosan is capable of binding various fatty acids to form the corresponding complex salts. I believe that the binding is induced by the number of free amino groups in the chitosan which forms an ionic bond causing a binding effect considerably stronger than that obtained in conventional absorption or adsorption. The chitosan-fatty acid complexes can be prepared by neutralization of chitosan with various amounts of fatty acids, preferably edible fatty acids, such as oleic, linoleic, palmitic, stearic or linolenic acid. These complexes can be prepared by neutralization of the chitosan with various amounts of these fatty acids, including stoichiometric amounts, less than stoichiometric amounts, or greater than stoichiometric amounts than those required for the neutralization of the chitosan. The chitosan-fatty acid complex, after ingestion by a mammal, will bind additional lipids, most probably due to its strong hydrophobic characteristic. Such lipids include natural triglycerides, fatty and bile acids, and cholesterol and other sterols, and a great portion of these bound lipids will be excreted rather than absorbed and utilized by the mammal. This is believed due to the following factors:

Chitosan's inherent insolubility, nonabsorbability, and undigestibility;

The strong ionic binding of fatty and bile acids which prevent their release for absorption and utilization;

The inability of the hydrochloric acid in the stomach to hydrolyze the chitosan-fatty acid complexes (complex does not wet);

The tendency of the complexes to grow in size as they travel through the gastro-intestinal tract and gradually absorb and bind additional lipids;

The ability of the chitosan-fatty acid complex to bind dietary triglycerides which are hydrolyzed by lipase and released as fatty acids or other volatile fatty acids (acetic, formic, butyric) formed by microbial degradation in vivo and The ability of the chitosan to bind to its matrix and promote the excretion of cholesterol and sterols which will be solubilized in the lipophilic phase.

In accordance with one embodiment of the invention, the chitosan, as such or in the form of its fatty acid complex, is admixed with a food substance to form a composition consisting of the food substance containing a minor quantity, as for example, between 1 and 10 percent by weight, of the added chitosan, as such or as a fatty acid complex. This food composition, containing the minor quantity of the added chitosan, has a lower effective caloric value than the corresponding amount of food without the chitosan, as the chitosan in the composition has the ability of binding and preventing the absorption of a large amount of lipids. The food composition, when ingested, will thus reduce the fat intake of the mammal, promoting the binding and excretion of fatty materials such as cholesterols, sterols, triglycerides, and the like. The chitosan, as such, is not capable of binding neutral oil, but once complexed with a fatty acid, the complex is capable of absorbing neutral oil. Therefore, it is often desirable to use the chitosan at least partially in the form of its fatty acid complex.

The chitosan itself, i.e., not in the form of fatty acid complex, may, for example, be utilized as a low calorie filler in connection with various foods, such as breads, cakes, cookies, and the like.

In the form of the fatty acid complex, as for example, with linoleic acid, palmitic acid, stearic acid, or linolenic acid, the same may be used as a fat extender added, for example, to margarine, spreads and dips, salad dressing, or the like.

The characteristics of the chitosan, with respect to its non-digestibility, its biodegradability, and its bland taste make the same excellent as a food additive and, due to its ability to bind the lipids, may be considered as having a negative caloric value, i.e., lowering calorie effect of the foods to which it is added.

Chitosan, in accordance with a further embodiment of my invention, finds application as a pharmaceutical for the treatment of gall bladder disease, in which the absorption and utilization of lipids is not desirable; in the treatment of obesity; and in gastro-intestinal disorders or coronary disease where bile acids, cholesterol and other sterol lowering is desirable.

As a pharmaceutical preparation, the chitosan and/or the chitosan-fatty acid complex, may be admixed to form a pharmaceutical composition with any inert pharmaceutical carrier. Chitosan may be incorporated in a pharmaceutical preparation in the form of a suspension or dispersion, for example, an aqueous suspension or dispersion containing chitosan, water, and, if desirable, an edible acid such as linoleic acid.

Dosage units effective for the treatment of obesity, gall bladder and gastro-intestinal disorders, and the like may vary between units containing 3 to 12 grams of the chitosan—chitosan fatty-acid complex, preferably 4 to 7 grams of the chitosan—chitosan-fatty acid complex. The pharmaceutical should be orally administered, preferably in the unit dosage form and preferably before meals.

The following examples are given by way of illustration and not limitation.

EXAMPLES

Example 1

| Rye Bread | | |
|---|---|---|
| Ingredients | Grams | |
| Sour rye culture | 450 | |
| Salt | 141 | Blend these ingredients together at slow speed |
| Molasses (dark) | 170 | for about 6-8 minutes. |
| Malt (nondiastatic) | 112 | |
| Caraway seeds | 28 | |
| Water | 3630 | |
| Chitosan (100 mesh) | 365 | |
| Cream of rye flour | 2090 | |
| Yeast (variable) | 340 | Dissolve yeast in water. Add flour to above flour |
| Water | 900 | mixture and mix slightly. Add shortening and develop |
| Flour, strong first clear | 5270 | dough at slow speed. |
| Shortening | 142 | |

Dough temperature: 80°-82° F.
Fermentation time: 1 hour with sour culture, 40 minutes with fermented sour rye sponge dough
To bench or scaler-rounder: Scale and round with resting periods 15 to 20 minutes
Mold: round or long shape
Proof: ¾ proof
Baking: Bake with steam at 411° F.

Example 2

| Pound Cake | |
|---|---|
| Ingredients | Grams |
| Flour (cake) | 1820 |
| Chitosan (100 mesh) | 450 |
| Shortening (emulsified) | 1590 |
| Salt | 57 |
| Milk solids, nonfat | 142 |
| High fructose syrup 42 | 177 |
| Sugar | 2724 |
| Water | 1000 |
| Whole eggs | 1590 |
| Flavor | 28 |

Preparation

Flour, chitosan and shortening are mixed for 2-4 minutes. Then sugar, salt, nonfat milk solids, high fructose syrup and water are added and mixed for 5 minutes at same speed. Finally, eggs and flavor are added and mixed for 5 minutes at low speed.

Large loaves are baked at 340° F.

Example 3

Preparation of chitosan—fatty acid complex

Emulsion consisting of linoleic acid (or any fatty acid) and water is prepared by homogenization or by vigorous stirring (Waring blender) of 600 ml water containing
0.1-1.0 g benzoic acid (preservative)
1-7 g polysorbate 80 (emulsifier) and
300 ml linoleic acid containing
0.05 g BHA (antioxidant)

The good quality emulsion is usually obtained in less than one minute of stirring.

70 g of chitosan powder (80-200 mesh) is added to the emulsion and stirring (homogenization) is continued for another one minute. The complex of chitosan—linoleic acid is then isolated by filtration.

The ratio of fatty acid to chitosan for the preparation of the complex may vary considerably, depending on specific requirements. The preferential ratio is between 0.1:1.0 and 5:1.

Example 4

| Salad Dressing with Blue Cheese Flavor | |
|---|---|
| Ingredients | Grams |
| Salt | 6.3 |
| Cream cheese | 149.0 |
| High fructose corn styrup 42 | 17.6 |
| Vinegar | 14.0 |
| Dehydrated parsley flakes | 1.5 |
| Oil | 38.4 |
| Chitosan/oleic acid complex | 20.5 |
| Blue cheese flavor | to taste |
| Water | 53.0 |

Preparation

Cream cheese is whipped in mixer. All liquids are mixed together. All dry ingredients are mixed together. The mixes are added gradually to whipped cream cheese and mixed together until homogenous paste is obtained. The product is refrigerated.

Example 5

| Chicken Noodle Soup Mix | |
|---|---|
| Ingredients | Grams |
| Salt | 38.0 |
| Monosodium glutamate | 22.0 |
| Chitosan/oleic acid complex | 10.0 |
| Chicken fat | 7.1 |
| Dehydrated chicken | 13.0 |
| Onion powder | 2.8 |
| Sugar | 2.0 |
| Wheat flour | 3.0 |
| Hydrolyzed vegetable protein | 1.2 |
| Ground parsley | 0.6 |
| Ground pepper | 0.3 |

Procedure

Mix all ingredients.

Fill 16 grams of the above soup mix and 41 grams of fine noodles into 4-ply laminated soup packets and heat-seal.

Rehydration

Add contents of a packet to 1 pint of boiling water. Simmer 5-8 minutes.

Example 6

Preparation of chitosan powder mixture for oral administration

| Ingredients | Grams |
|---|---|
| Chitosan powder (100-200 mesh) | 80.0 |
| Lactose | 10.0 |
| Sucrose | 9.9 |
| Orange flavor (or other | |

| Ingredients | Grams |
| --- | --- |
| flavor) as desired | 0.01–0.1 |

An intimate mixture of these ingredients is prepared in mixer or blender and it is then packed into individual packages containing 4–5 grams of powder. This dosage should be administered as a suspension in water or a flavored vehicle.

Maximum daily intake: 16–20 grams

Example 7

Paste (cream) of chitosan—fatty acid complex for oral administration

A. Preparation of the Emulsion

| | |
| --- | --- |
| 0.3 g | Benzoic acid |
| 1.5 g | Polysorbate 80 |
| 0.02 g | Saccharin |
| 20 ppm | FDAC Green No. 3 (colorant) |
| | is dispersed in 600 ml water |
| 0.01 g | BHA (Butylated hydroxyanisole) |
| 0.04 g | Peppermint Oil (flavor) |
| | is dispersed in 100 ml of oleic acid |

B. Preparation of the Complex

The water and oleic acid solutions are then combined and emulsion is prepared by stirring in Waring Blender for 30–60 seconds.

70 g of finely powdered chitosan (100 mesh) is added to this emulsion, the dispersion is vigorously stirred in blender for an additional 30–60 seconds and the formed complex is filtered off and packed into appropriate containers and stored under refrigeration.

The complex can then be used for oral administration.

Although the invention has been described in detail with reference to certain specific embodiments, various changes and modifications will become apparent to the skilled artisan. The invention is only intended to be limited by the appended claims or their equivalents wherein I have endeavored to claim all inherent novelty.

What is claimed is:

1. A method of reducing lipid absorption in mammals which comprises orally administering to the mammal an amount of chitosan effective to substantially reduce the lipid absorption.

2. A method according to claim 1 in which said chitosan is in the form of a fatty acid complex.

* * * * *